United States Patent
Mellor

[15] 3,649,988
[45] Mar. 21, 1972

[54] WINDSCREEN WIPER ASSEMBLIES

[72] Inventor: Walter Mellor, Sutton Coldfield, Warwickshire, England

[73] Assignee: Joseph Lucas (Industries) Limited, Birmingham, England

[22] Filed: Mar. 31, 1970

[21] Appl. No.: 24,296

[30] Foreign Application Priority Data

Apr. 24, 1969 Great Britain......................21,014/69

[52] U.S. Cl..........................15/250.3, 15/150.2, 15/150.34, 188/67
[51] Int. Cl. .........................................................A47l 13/20
[58] Field of Search.............188/67, 77 W; 192/12 BA, 41 S; 15/250.31, 250.23, 250.2, 250.3, 250.34

[56] References Cited

UNITED STATES PATENTS 3,153,370  10/1964  Heimall...........................188/77 W X

FOREIGN PATENTS OR APPLICATIONS 512,138  8/1939  Great Britain......................15/250.23

Primary Examiner—George E. A. Halvosa
Attorney—Holman & Stern

[57] ABSTRACT

In a windshield wiper assembly a bearing sleeve is secured to the vehicle body adjacent the windshield and a spindle is journalled for angular movement in said sleeve, the spindle having a windshield wiper blade at one end and being coupled to a reciprocable member at its other end for moving the windshield wiper blade over the windshield. Possible over-travel on a wet windscreen is prevented by having a part engaged with the spindle for movement therewith, the part being arrested during angular movement of the spindle in either direction from a central position so that the remainder of the movement of the spindle in that direction takes place relative to said part the friction between said part and the spindle minimising the possible over-travel.

2 Claims, 1 Drawing Figure

PATENTED MAR 21 1972　　　3,649,988
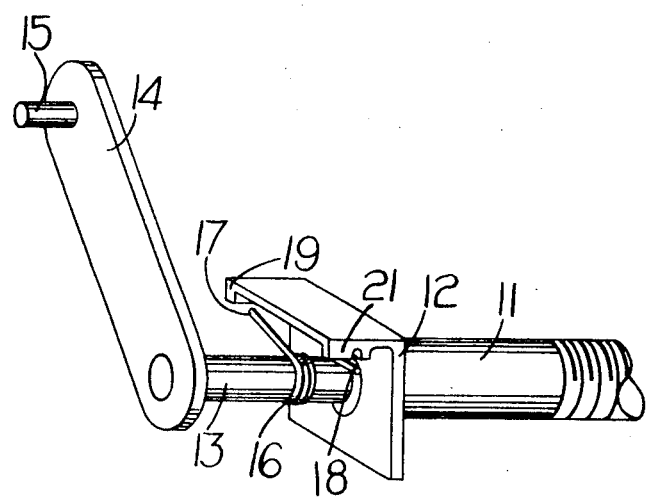
INVENTOR
Walter Mellor
Holman, Glascock, Downing & Seebold
ATTORNEYS

WINDSCREEN WIPER ASSEMBLIES

This invention relates to windscreen wiper assemblies for road vehicles, of the kind including a bearing sleeve arranged to be secured to the vehicle body adjacent the windscreen, and a spindle journaled for angular movement in said sleeve, said spindle being adapted at one end to be coupled to a reciprocable member in such a manner that the spindle reciprocates angularly when said member reciprocates, and the spindle being adapted at its other end to carry a windscreen wiper blade in wiping contact with the vehicle windscreen.

It is found that in use owing to the difference in the degree of friction between the wiper blade and a wet windscreen and the wiper blade and a dry windscreen and also to clearance due to tolerance build up in the linkage, and the inertia of an assembly of the kind specified, the stroke of the wiper blade can be greater when the blade wipes a wet windscreen than when the blade wipes a dry or almost dry windscreen. This possible overtravel in the wiping stroke on a wet windscreen is undesirable and it is an object of the present invention to minimize the possible overtravel.

According to the present invention a windscreen wiper assembly of the kind specified includes a part engaged with the spindle for movement therewith, and means for arresting said part during angular movement of the said spindle in either direction from a central position so that the remainder of the movement of the spindle in that direction takes place relative to said part and friction between said part and the spindle minimize the possible overtravel in use when the wiper blade is wiping a wet screen.

The accompanying drawing is a perspective view of part of a windscreen wiper assembly according to one example of the invention.

Referring to the drawing, the windscreen wiper assembly includes a bearing sleeve 11 having a flange 12 at one end thereof. The flange 11 is inserted through a hole in the body of a road vehicle, immediately below the windscreen of the vehicle, with the flange 12 engaged with the inner surface of the body. A nut is then engaged with a screw-threaded portion of the sleeve 11, and is tightened to engage the outer surface of the body, to lock the sleeve 11 in position. Extending through the sleeve 11, and journaled for angular movement therein is a spindle 13 which projects from both ends of the sleeve 11. The portion of the spindle 13 (not shown) which projects from the exterior of the vehicle body is splined, and is adapted in the usual way to receive a windscreen wiper arm carrying a wiping blade which is spring urged into engagement with the windscreen of the vehicle. At its inner end the spindle 13 is secured to one end of a crank arm 14, the opposite end of which carries a post 15 extending parallel to the spindle 13. The post 15 is pivotally engaged with one end of a rigid connecting link, the opposite end of which is pivotally engaged with a similar post on a second similar wiper assembly. In use, the rigid connecting link is driven by conventional means in a reciprocatory manner, through a predetermined stroke, so that the wiper blades perform a similar reciprocatory movement over the windscreen of the vehicle, following an arcuate path, the center of curvature of which lies on the axis of the spindle 13.

Owing to manufacturing tolerances in the windscreen wiper assemblies, and in the drive mechanism for the windscreen wiper assemblies, the inertia of the windscreen wiper assemblies can cause the blades of the wiper assemblies to traverse a slightly large stroke than the stroke through which they are moved by the connecting link. When the blades of the wiper assemblies are wiping a dry, or almost dry windscreen, the friction between the blades and the windscreen is sufficient to damp the movement of the windscreen wiper assemblies to prevent such overtravel at the ends of the wiping stroke. However, when the windscreen of the vehicle is wet, the friction between the blades and the windscreen is reduced, as compared with the friction between the blades and the windscreen when the windscreen is dry, or almost dry, and so the damping of the movement of the blades is reduced, and a degree of overtravel can occur.

In order to minimize the overtravel of the blades of the windscreen wiper assemblies, when the windscreen is wet, a torsion spring 16 is engaged on the spindles 13 of each of the windscreen wiper assemblies. Each torsion spring 16 surrounds and grips its respective spindle 13, and the straight ends 17, 18 of each spring 16 extend in generally opposite directions, generally radially outwardly from the spindle 16. The flange 12 of the sleeve 11 of each of the assemblies is provided with a pair of spaced stops 19, 21 engageable by the ends 17, 18 of the respective spring 16, and the arrangement is such that when the windscreen wiper blades are at the midpoint in their stroke, then the ends 17, 18 of the springs 16 are spaced from their respective stops 19, 21. During movement of the spindle 13 relative to its associated sleeve 11, the spring 16 moves with the spindle 13 until one of the ends 17, 18 of the spring 16 engages its respective stop 19, 21, whereupon the movement of the spring 16 is arrested, and further movement of the spindle 13 takes place relative to the spring 16. The arrangement is such that during movement of a windscreen wiper blade from the midpoint of its stroke towards one end of its stroke the end 18 of the spring 16 will engage the stop 21, while during movement of the blade from the midpoint of its stroke towards the other end of its stroke the end 17 of the spring will engage the stop 19. The spacing of the ends 17, 18 of the spring 16 from the stops 19, 21 is such that the ends 17, 18 of the spring only engage their respective stops towards the ends of the stroke of the wiper blades. Thus, adjacent the ends of a stroke of the wiper blades the movement of the spindle 13 relative to the sleeve 11 will be damped by the friction between the spring 16 and the spindle 13, and so overtravel of the blades beyond the position to which they are driven by the connecting link will be minimized.

The springs 16 are so arranged, that movement of the spindle 13 relative to the springs 16 tends to tighten the springs 16 on the spindle 13, and so the friction between a spring 16 and its associated spindle 13 will increase progressively from the point at which an end of the spring engages its respective stop. The friction between the spindles 13 and their respective springs 16 is not sufficient to stall the drive motor of the windscreen wiper arrangement, and so the windscreen wiper blades will always to moved to the end of their stroke, and by virtue of the provision of the springs 16 the stroke of the windscreen wiper blades will be substantially constant regardless of whether the screen is dry or wet.

Having thus described my invention what I claim as new and desire to secure by Letters Patent is:

1. A windscreen wiper assembly including a bearing sleeve, means on the bearing sleeve whereby the bearing sleeve can be secured to a vehicle body adjacent a windscreen of the vehicle body in use, a spindle, the spindle being journaled for angular movement in said bearing sleeve, and said spindle being adapted at one end to be coupled to a reciprocable member in such a manner that the spindle reciprocates angularly when said reciprocable member reciprocates, the spindle being adapted at its other end to carry, in use, a windscreen wiper blade in wiping contact with the vehicle windscreen, a part engaged with the spindle for angular movement therewith, and means for arresting said part during angular movement of said spindle in either direction from a central position so that the remainder of the movement of the spindle in that direction takes place relative to said part, and friction between said part and the spindle minimizes the possible overtravel which can occur in use when the wiper blade is wiping a wet screen.

2. A windscreen wiper assembly as claimed in claim 1 in which said part is a torsion spring surrounding the spindle.

* * * * *